United States Patent

[11] 3,624,533

[72] Inventor Peter Schiff
R.D. #2, Lambertville, N.J. 08530

[21] Appl. No. 839,888
[22] Filed July 8, 1969
[45] Patented Nov. 30, 1971

[54] DIFFERENTIAL PREAMPLIFIER
7 Claims, 1 Drawing Fig.

[52] U.S. Cl. .......... 330/30, 330/35, 330/69
[51] Int. Cl. .......... H03f 3/16, H03f 3/68
[50] Field of Search .......... 307/279, 304; 330/9, 30, 30 D, 38 FE, 69, 24

[56] References Cited

UNITED STATES PATENTS

| | | | |
|---|---|---|---|
| 3,317,758 | 5/1967 | Nazareth, Jr. et al. | 307/304 X |
| 3,395,359 | 7/1968 | Zachev | 330/30 X |
| 3,196,362 | 7/1965 | Smith, Jr. | 330/24 X |

OTHER REFERENCES

B. J. M. Overgoor " An Operational Amplifier With Differential FET Input" Electronics Applications pp. 16– 26, 3–69 (307/304)

*Primary Examiner*—Roy Lake
*Assistant Examiner*—Lawrence J. Dahl
*Attorney*—Ostrolenk, Faber, Gerb & Soffen

ABSTRACT: A differential preamplifier of the AC coupled type for measuring very small voltage differences between two input signals. The circuit employs an operational amplifier accepting the input signals at its inverted and noninverted input terminals, respectively. The first and second input signals being compared are applied to the inputs of respective field effect transistors which exhibit high-input impedance and low-output impedance. The field effect transistors are operated as current amplifiers yielding substantially unity voltage gain. Their outputs are connected through capacitive elements to the inverted and noninverted inputs, respectively, of the operational amplifier. The capacitors compensate for any constant or DC offset which may occur in the signal sources. Oppositely polarized semiconductor elements are connected in parallel across the input leads of the capacitors to severely limit overload voltage conditions. The low output impedances of the FET's connected thereto are such that the relatively low impedance of the diodes which are operated in a forward biased mode just below their threshold voltage, has no effect upon the low-impedance signals appearing at the source electrodes of the FET's so as to yield excellent common mode rejection characteristics. Diode clamps are provided to prevent overdrive and burn out of the FET's. Adjustable resistors are provided for balancing the FET outputs and for nulling the offset voltage of the operational amplifier at 0 volts when the signals applied to the circuit input terminals are of equal value.

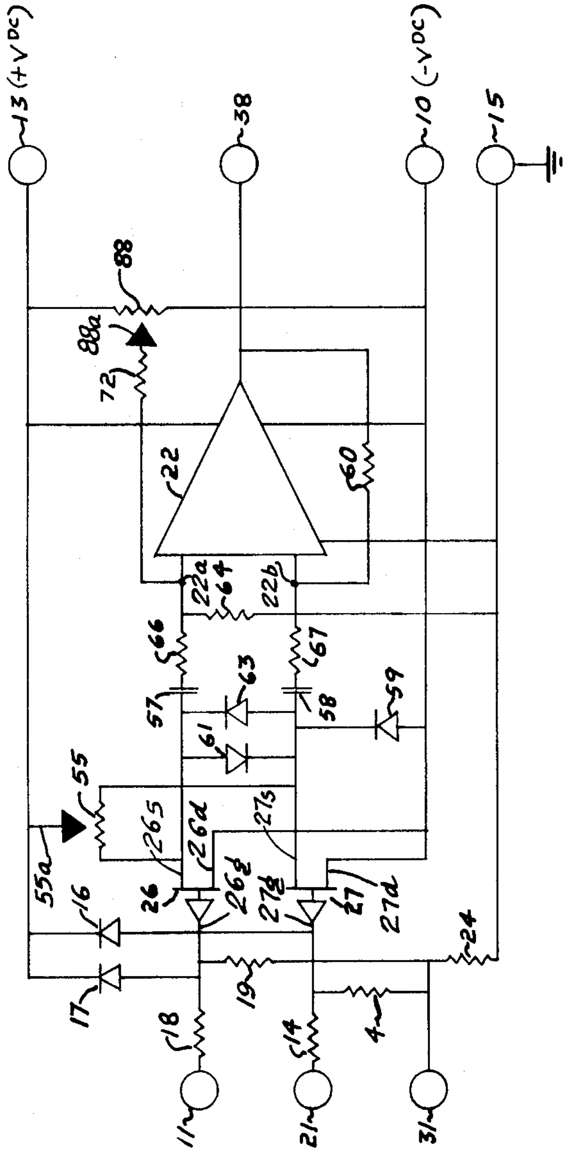
PETER SCHIFF
INVENTOR.
BY
OSTROLENK, FABER, GERB & SOFFEN
ATTORNEYS

DIFFERENTIAL PREAMPLIFIER

The present invention relates to measuring circuits, and more particularly to a novel differential preamplifier circuit capable of detecting voltage differences between plural input signals which may be of the order of millivolts and which input signals may be affected by transient voltages or other sources present in either the preamplifier circuit or in the input signal sources.

Many electronic measurement applications such as, for example, in the medical field, require the observation and recording of minute differential voltages in environments which may contain relatively high-electrical noise interference. As one example, in the field of electrocardiography, it is frequently desired to measure the difference in voltage levels appearing at electrodes in electrical contact with the body wherein a first electrode may be connected to one of the body limbs (such as the left or right hand—in the region of the wrist or the left leg—in the region of the ankle) and wherein another of the electrodes may be connected directly to the heart (i.e., through a precordial lead). A third lead which may be considered to be the body ground or reference potential lead is commonly connected to the right leg. When measuring the electrical signals detected by the electrodes, noise interference may be present which can affect the accuracy of the difference in voltage levels of the input signals. For example, changes in contact resistance between the electrode and the body portion due to movement of the patient, perspiration or other body activity will affect the differential voltage. Also, any DC levels appearing in the signals will affect the accuracy of the measurement. It is thus important to provide a differential preamplifier having the characteristics of high-input impedance, high-common mode rejection, low noise and fast recovery time from overload voltages which may occur during the measurement period in one or both of the input signal sources.

A differential preamplifier circuit is disclosed herein which is characterized by displaying the desirable features of differential DC voltage rejection and low noise (among other advantages) when operating as a high-gain direct coupled differential preamplifier employed in medical applications wherein extremely low-differential potentials are measured.

A consistent or electrolytic potential difference (which may, for example, be due to changing contact resistance between the body and the measuring electrodes) between the two-sensing electrodes will cause an overdriving of the differential amplifier. Whereas the technique of capacitor filtering may be employed in the input circuit to avoid amplification of the direct or constant input differential potentials, such capacitors add a detrimental time constant to the overload recovery time of the circuit in cases where the input may be subjected to a large potential which will charge the capacitors. If a high input impedance preamplifier is employed, the discharge time of the capacitors will be extremely long, thereby significantly reducing the effectiveness of the circuit.

In addition thereto, in order to obtain a low-noise amplifier, it has been found desirable to use field effect transistors as part of the input circuit. Devices such as field effect transistors do not generally lend themselves to use in DC direct-coupled circuitry due to their unstable DC operating characteristics. The circuit of the present invention is characterized by permitting the use of field effect transistors in combination with a high-gain DC coupled operational amplifier which thereby combines the low-noise and high-input impedance characteristics of field effect transistors with a rapid recovery time and DC input voltage isolation through the use of coupling capacitors inserted between the field effect transistors and the inputs to the operational amplifier.

BACKGROUND

Low-level differential preamplifiers may be categorized generally as DC or AC coupled preamplifiers. A DC coupled preamplifier offers the advantage of very rapid recovery time from overload voltages since no coupling capacitors have to be recharged after an overload condition has occurred. However, any constant or DC offset voltage which appears between the differential input electrodes would necessarily be amplified by the preamplifier yielding an incorrect output signal. In the AC coupled type of preamplifier which employs DC isolation capacitors, any constant differential input potential is rejected and only alternating voltage signals will be amplified by the circuit. However, in the presence of excessive input voltage surges which may occur during the period of measurement, the coupling capacitors will be charged by such input voltage surges and must therefore be discharged before the differential amplifier will again track the AC input voltage. It is desirable to employ field effect transistors in the input of a low-level preamplifier because of their low-noise and very high-input impedance characteristics. When such devices are utilized, in circuits of this type, AC or capacitor coupling is generally necessary due to the unstable nature of such field effect devices. The preamplifier circuitry resulting therefrom (i.e., employing field effect transistors) and including conventional DC coupled differential amplifier would be of the AC amplifying type having poor overload recovery time and a limited common mode rejection characteristic when used with discrete field effect transistors. However, if the permissible voltage swing of the coupling capacitors is limited by the use of a pair of oppositely polarized diodes connected in parallel fashion, these diodes will affect the high-input impedance of the preamplifier when placed in the input circuit due to the relatively high leakage of such diodes when they are not reverse biased.

SUMMARY

The differential preamplifier designed in accordance with the principles of the present invention provides a low-level differential preamplifier circuit which permits a rejection of DC differential input voltages with high-input impedance, has excellent common mode rejection characteristics of both DC and AC input voltages, and has a very rapid overload recovery time. Means are provided in the circuitry for overcoming the relatively poor common mode rejection characteristics exhibited by field effect transistors which are used in the circuit, as well as the provision of clamping devices to prevent the possible overdrive of the circuit by large input signal swings to cause either damage or burn out to the circuit components.

It is, therefore, one object of the present invention to provide a novel differential amplifier circuit capable of detecting minute voltage differences between a pair of input signals being measured.

Another object of the present invention is to provide a differential preamplifier employing an operational amplifier circuit adapted to receive a pair of input signals to be compared at its inverting and noninverting inputs and incorporating means for rejecting constant differential input potentials which may be present in the input signals, means for providing fast overload recovery and an input circuit coupled between the signals to be measured and the operational amplifier inputs so as to present the fast overload recovery means to the isolating circuits.

These, as well as other objects of the present invention will become apparent when reading the accompanying description and drawing in which:

The sole FIGURE shows a circuit diagram of a preferred embodiment of the differential preamplifier designed in accordance with the principles of the present invention.

The circuit of the FIGURE comprises an operational amplifier 22 which is supplied by a positive input potential bias at terminal 13, a negative biasing potential at terminal 10 and a ground potential at terminal 15, respectively. The noninverting input terminal 11 of the differential preamplifier circuit is connected through resistor 18 to the gate 26*g* of junction field effect transistor 26 which is of the "P"-type. A diode 17, having its anode connected to the gate 26*g* of field effect transistor 26 and having its cathode electrode coupled to terminal 13 serves to prevent overdrive of the field effect device so as to eliminate possible damage or burn out by clamping the maximum positive voltage which may be applied to gate 26*g* to the positive DC level applied to terminal 13.

A resistor 19 is connected between gate 26*g* of field effect transistor 26 and a "body reference" terminal 31.

The inverting input terminal 21 of the differential preamplifier is connected through resistor 14 to gate 27*g* of junction field effect transistor 27, which gate is also connected to terminal 13 through diode 16 whose anode is connected to gate 27*g* and whose cathode is connected to terminal 13. The gate 27*g* is further connected to terminal 31 through resistor element 4. Terminal 31 is connected in common to resistors 4 and 19, as well as being connected to terminal 15 through a resistor element 24. Terminal 15 is connected to circuit ground, as shown.

The drain electrodes 26*d* and 27*d* of field effect transistors 26 and 27 are directly connected to terminal 10 (which, as mentioned above, is coupled to a negative DC bias). The source electrode 26*s* of field effect transistor 26 is connected through potentiometer 55 to the source electrode 27*s* of field effect transistor 27. The adjustable slider arm 55*a* of potentiometer 55 is connected to terminal 13 and is employed for balancing the preamplifier in a manner to be more fully described.

Capacitor 57 is connected between source electrode 26*s* of transistor 26 and a resistor 66, which, in turn, is connected to the noninverting input terminal 22*a* of operational amplifier 22. The source electrode 27*s* of transistor 27 is connected through the series circuit comprised of capacitor 58 and resistor 67 to the inverting input terminal 22*b* of operational amplifier 22.

Diodes 61 and 63, which are connected in parallel and in opposing polarity, connect the sources 26*s* and 27*s* of transistors 26 and 27. Diode 59 is coupled between source 27*s* of transistor 27 and terminal 10 in the polarity as shown.

The output of operational amplifier 22 which appears at terminal 38, is connected through a resistance element 60 to the inverting amplifier input terminal 22*b*. The noninverting input terminal 22*a* of the operational amplifier 22 is connected to the adjustable slider arm 88*a* of a potentiometer 88 through resistance element 72. As can be seen, resistance element 88 is connected across terminals 10 and 13.

With the proper supply voltages applied to the differential preamplifier circuit in the manner shown, field effect transistors 26 and 27 operate as high-input impedance current amplifiers, similar in nature to conventional emitter-follower transistor circuits. As was previously mentioned, electrodes coupled to appropriate positions of the body of a subject being examined are, in turn, coupled to the noninverting and inverting input terminals 11 and 21, respectively. A body reference electrode, typically connected to the right leg of the patient, is connected to the reference terminal 31.

The input signals applied to terminals 11 and 21 appear at the source electrodes 26*s* and 27*s* of field effect transistors 26 and 27. The common electrode 31 is isolated from circuit ground (i.e., terminal 15) by resistor 24. Resistor 24 serves to eliminate the application of high currents through biasing resistors 4 and 19 between the input terminals 11 and 21 and circuit ground 15, as well as isolating any potential difference from the patient which may exist between body reference terminal 31 and circuit ground 15. For example, if the "body reference" electrode which is connected to terminal 31 were directly connected to circuit ground terminal 15, any potential difference existing therebetween would appear in the form of currents applied to input resistors 14 and 18, thereby upsetting the differential voltage signals. By providing a resistor 24 between the body reference terminal 31 and circuit ground 15, any constant voltage differences which may exist will be applied to resistor 24.

The circuit of the FIGURE may employ discrete components as opposed to being formed of a monolithic circuit. For example, discrete FET's may be employed as an alternative to a monolithic circuit. The FET's 26 and 27 do not have to have extensive selection so as to be a matched pair since balancing and matching of the field effect transistors 26 and 27 is accomplished by the variable loading of the transistors through adjustment of potentiometer 55 so that the differential input signals applied between terminals 11 and 21 will be equally attenuated between the source electrodes of field effect transistors 26 and 27. This differential voltage is coupled through coupling capacitors 57 and 58 to the input of the DC coupled operational amplifier 22. The offset voltage of the operational amplifier is adjusted to zero by potentiometer 88 (and the resistor 72 of high-ohmic value). Adjustment of a common-mode voltage to a zero value may be performed by applying a single signal in common to input terminals 11 and 21 and then adjusting potentiometer 55 until the voltage appearing at output terminal 38 is zero. The circuit is thus adjusted and ready for use in examining input signals to be compared such as, for example, signals derived from the body of a patient.

In cases where an overload signal applied at terminals 11 and/or 21 occurs, diodes 16 and 17 avoid damage and/or destruction of the junction field effect transistor gates by clamping the maximum positive voltages appearing on the gates of these devices to the positive supply voltage level connected at terminal 13.

A negative voltage applied at differential input terminals 26*g* and 27*g* will be conducted by the junction of the "P"-type field effect transistors and will appear at the source electrodes 26*s* and 27*s* of these transistors. Diode 59 acts to clamp the maximum negative voltage appearing at the drain or gate electrodes of either of the field effect transistors to the value of the negative supply voltage connected to terminal 10, thereby protecting the transistors against possible extremes of drain to source voltages.

The field effect transistors have very low-noise characteristics and extremely high-input impedance and low-output impedance.

The signals being compared which are applied at terminals 11 and 21 are current amplified at the source electrodes 26*s* and 27*s*, respectively, and appear at the noninverting and inverting input terminals 22*a* and 22*b*, respectively, of operational amplifier 22 after passing through the series connected circuits 57–66 and 58–67, respectively. No DC amplification of the input signals will occur due to the AC coupling provided in the circuit as a result of capacitors 57 and 58.

Diodes 61 and 63 operate to prevent extremely high-voltage surges which may occur in the input signals from reaching the inputs of operational amplifier 22. For example, as soon as the voltage level at source electrode 26*s* goes slightly more positive than source electrode 27*s*, diode 61 will be operating in its forward bias region and just below its threshold level.

Diode 63 will operate in a similar fashion in cases where source electrode 27*s* goes slightly more positive than source electrode 26*s*.

Since, under normal operation, at least one of the diodes 61 and 63 will be slightly forward biased, the dynamic resistance of the forward biased diode will be of a rather small magnitude causing a serious loading effect upon the low-impedance signal sources applied to terminals 11 and 21. Field effect transistors 26 and 27 serve to isolate the low-impedance sources from the slightly forward biased diode due to their characteristics of high-input impedance and low-output impedance. The relatively high-leakage currents of diodes 61 and 63 (when operated in a forward biased mode just below their threshold voltage which is of the order of 0.6 volts) has relatively no effect on the low-impedance signal appearing at the source electrodes of field effect transistors 26 and 27 and therefore excellent common mode rejection characteristics are obtained from the operational amplifier 22.

The differential preamplifier isolates DC offset voltages by the capacitive coupling provided through capacitors 57 and 58. Diodes 61 and 63 which are coupled on the low impedance side of the field effect transistors, limit the maximum voltage excursion of the coupling capacitors so as to obtain a very rapid overload recovery time. Diodes 16, 17 and 59 and current limiting resistors 14 and 18 protect the field effect transistors 26 and 27 against possible burn out from extreme values of input voltage. It has been found that the field effect transistors need have only limited matching for similar offset voltages between the gate and drain when operated in this mode. The high-common mode rejection characteristics of the circuit are obtained by adjustment of potentiometer 55 which effectively loads the field effect transistors to get uniform attenuation of both inputs. The common mode rejection ratio which is directly proportional to the product of the input voltage and the gain of the operational amplifier and inversely proportional to the output common-mode signal, is of a substantially high value for the circuit described hereinabove due to the proper adjustment of potentiometer 55 and the resulting voltage level signals which may be applied to the inputs of the operational amplifier. The circuit described herein may use relatively conventional components and provides excellent operation at low cost. The operational amplifier may, for example, be an RCA type 3030A, the FET's may be conventional "P"-type field effect transistors of the discrete type (as opposed to the monolithic type) and the remaining components may be selected from those components generally available as "shelf items."

The limiting of the inverting and noninverting input signals applied to the operational amplifier through the use of diodes 61 and 63 provides an overload recovery time for the circuit of less than 1 second which compares very favorably with conventional techniques.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A differential amplifier for measuring voltage differences between a pair of input signals comprising:
   an operational amplifier having a pair of inputs for receiving said input signals and being adapted to generate an amplified signal at its output terminal which is representative of the difference in voltage levels of the input signals:
   first and second input terminals each adapted to receive an associated one of said input signals;
   first and second field effect transistors each having an input and an output;
   each of said transistor means inputs being connected to an associated one of said input terminals;
   first and second capacitor means each being coupled between the output of one of said transistor means and one input of said operational amplifier to isolate DC levels from said operational amplifier;
   first and second diode means being coupled in parallel between the outputs of said transistor means and being connected in opposing polarities to limit the differential voltage levels between said input signals which may be applied to the operational amplifier;
   adjustable means coupled across the outputs of both of said transistors for simultaneously compensating for any mismatch in the operating characteristics of said transistors.

2. A differential amplifier for measuring voltage differences between a pair of input signals comprising;
   an operational amplifier having a pair of inputs for receiving said input signals and being adapted to generate an amplified signal at its output terminal which is representative of the difference in voltage levels of the input signals;
   first and second input terminals each adapted to receive an associated one of said input signals;

first and second field effect transistors each having an input and an output;
   each of said transistor means inputs being connected to an associated one of said input terminals;
   first and second capacitor means each being coupled between the output of one of said transistor means and one input of said operational amplifier to isolate DC levels from said operational amplifier;
   first and second diode means being coupled in parallel between the outputs of said transistory means and being connected in opposing polarities to limit the differential voltage levels between said input signals which may be applied to the operational amplifier;
   each of said field effect transistors having a gate, a source and a grain electrode;
   said gate electrodes each being connected to said input terminals;
   a first bias source being connected in common to the drain electrodes of said field effect transistors;
   a second bias source;
   a potentiometer comprising a slider arm having first and second terminals and a resistor having first and second terminals;
   one terminal of said slider arm being connected to said second bias source; the second terminal of said slider arm lockingly engaging said resistor; said resistor first and second terminals being respectively connected to the source electrodes of said first and second field effect transistors;
   said slider arm being adjustable to adjust the loading of the transistors to compensate for any mismatch in transistor operating characteristics.

3. The device of claim 2 further comprising first and second clamping diodes each being connected between the gate electrode of an associated transistor and said second bias source for limiting the value of overload voltage which may be applied to the gate electrodes.

4. The device of claim 2 further comprising
   a clamping diode connected across the source and drain electrodes of one of said field effect transistors for limiting the value of overload voltages appearing across the source and drain electrodes of both of said field effect transistors.

5. The device of claim 1 further comprising
   a feedback path including a resistor connected between the output and inverted input of said operational amplifier.

6. The device of claim 2 further comprising:
   an adjustable resistance means having first and second terminals connected between said first and second bias sources and a third terminal connected to the noninverting input of said operational amplifier for adjusting the offset voltage of the operation amplifier to zero.

7. The device of claim 2 further comprising:
   a first resistor element having a first terminal connected to circuit ground;
   a reference input terminal connected to the remaining terminal of said resistor element;
   second and third resistors each having a first terminal connected in common to said reference input terminal and having their remaining terminals respectively connected to the gate electrodes of said first and second field effect transistors;
   fourth and fifth resistor elements each being connected between one of said input terminals and one of said gate electrodes;
   said first resistor element being adapted to divert any voltage differential between said reference input terminal and said circuit ground from said fourth and fifth resistor elements.

* * * * *